Figure 1:
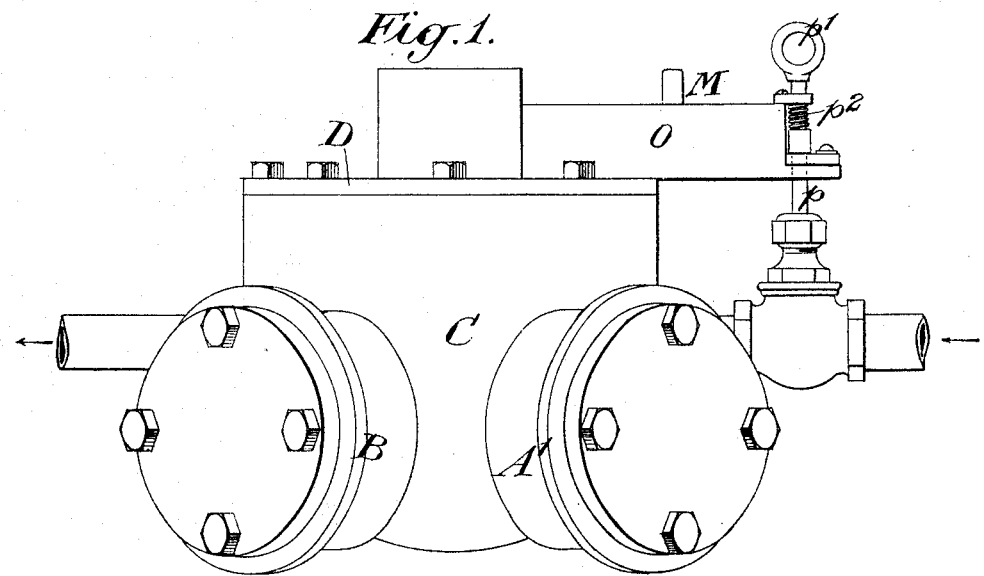
Figure 2:
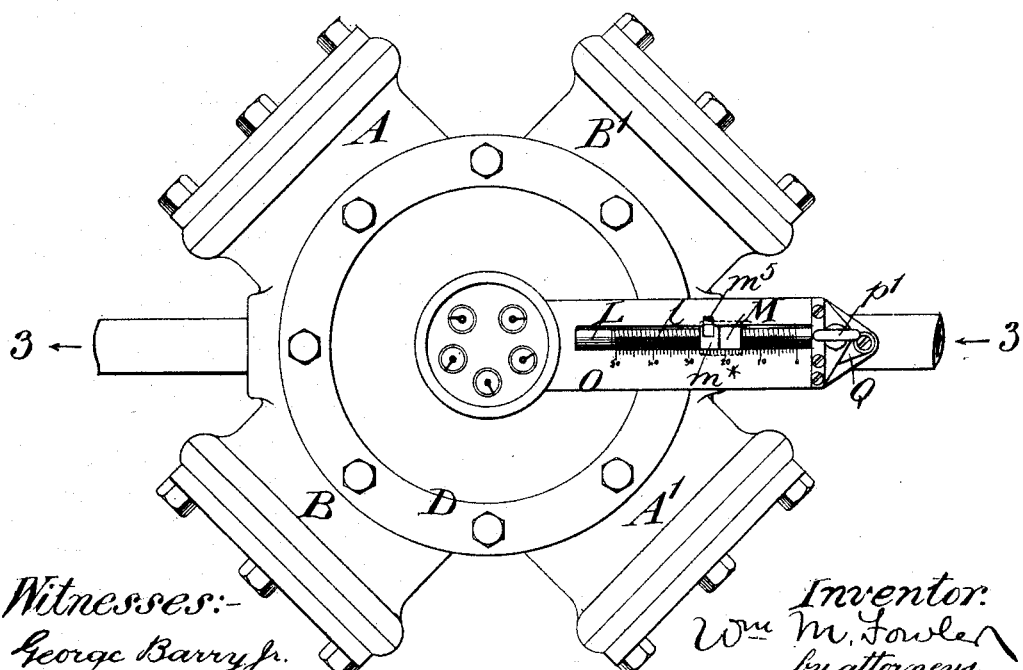
Figure 3:
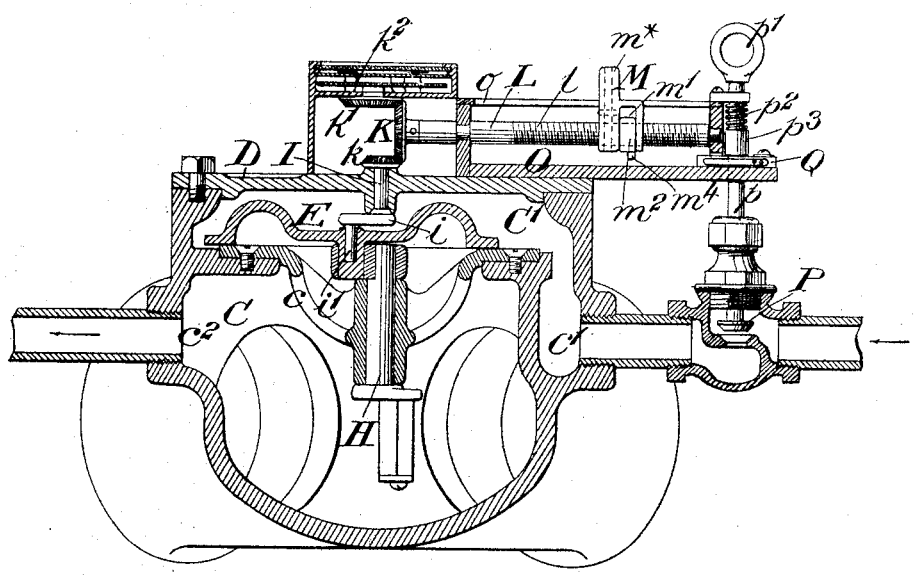
Figure 4:
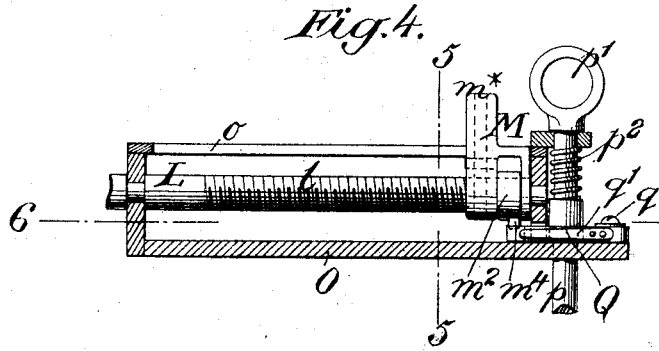
Figure 5:
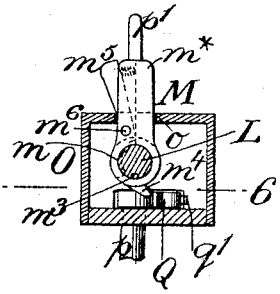
Figure 6:
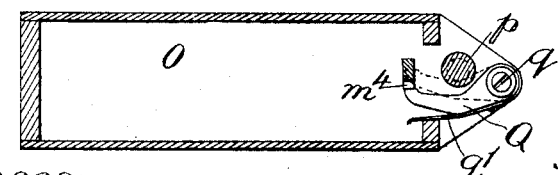

No. 619,473. Patented Feb. 14, 1899.
W. M. FOWLER.
LIQUID METER.
(Application filed May 1, 1897.)
(No Model.) 2 Sheets—Sheet 1.

Witnesses:—
George Barry Jr.
Edward Vieser

Inventor:
Wm. M. Fowler
by attorneys
Brown & Seward

No. 619,473. Patented Feb. 14, 1899.
W. M. FOWLER.
LIQUID METER.
(Application filed May 1, 1897.)
(No Model.) 2 Sheets—Sheet 2.

Witnesses:—
George Barry Jr.
Edward Virur

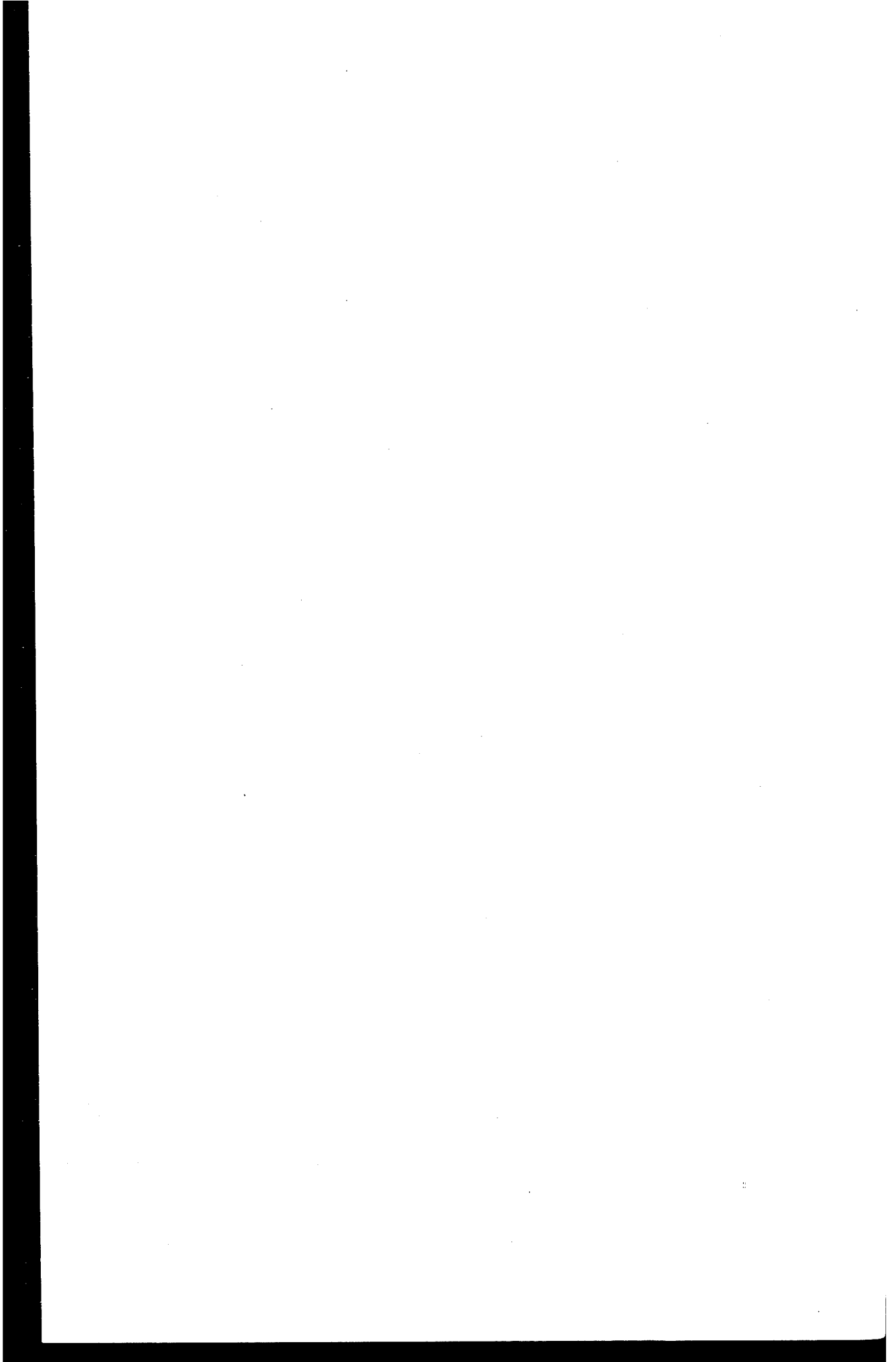

Inventor:—
Wm. M. Fowler
by attorneys
Brown & Seward